G. & S. P. CLARKE.
Hedge Trimmer.
No. 112,221. Patented Feb. 28, 1871.
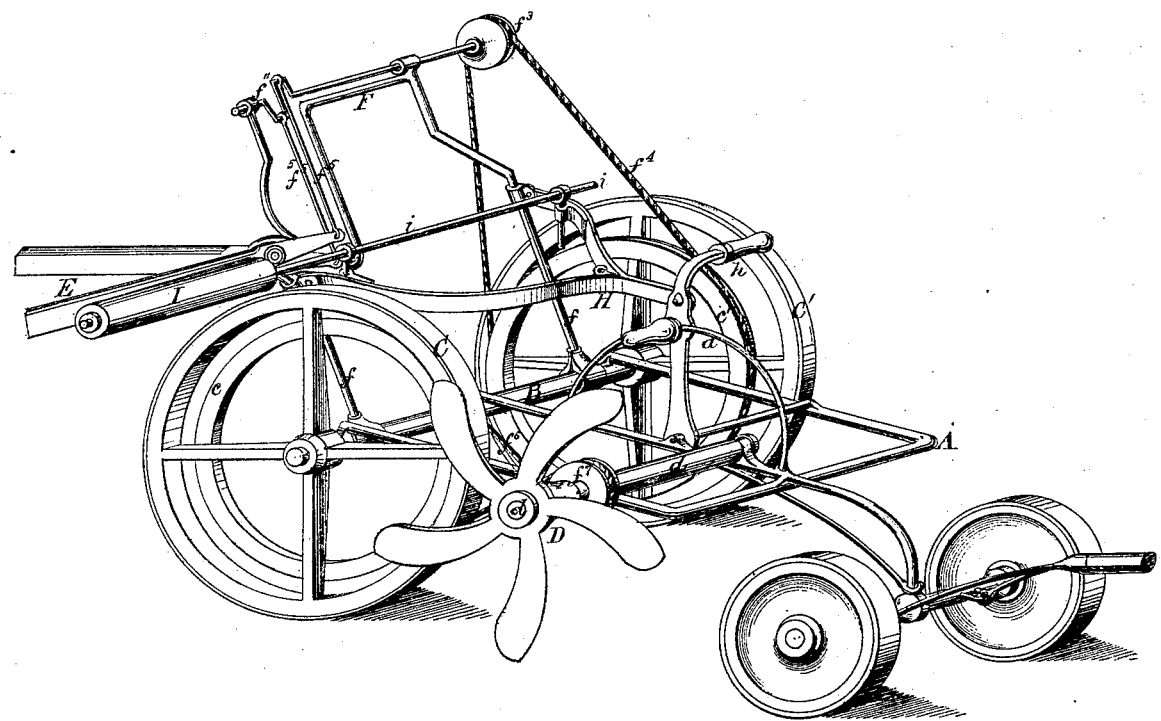
WITNESSES.
H. C. Elliott
J. Scheiflin
INVENTORS.
George Clarke
Sam'l P. Clarke
By Knight Bros.
Atty.

United States Patent Office.

GEORGE CLARK AND SAMUEL P. CLARK, OF DOVER, ASSIGNORS TO THEMSELVES AND FRANKLIN B. IVES, OF PRINCETON, ILLINOIS.

Letters Patent No. 112,221, dated February 28, 1871.

---

IMPROVEMENT IN HEDGE-TRIMMERS.

---

The Schedule referred to in these Letters Patent and making part of the same.

---

We, GEORGE CLARK and SAMUEL P. CLARK, of Dover, in the county of Bureau and State of Illinois, have invented a new and improved Hedge-Trimmer, of which the following is a specification.

The nature and objects of the invention are fully set forth in the following description and claims.

Description of the Accompanying Drawing.

Figure 1 is a perspective view of the machine.

General Description.

A is a horizontal frame, attached to the axle B of the machine.

C C' are the wheels, which carry within their outer circumference and attached to their spokes, grooved circles $c\ c'$, for receiving the belts by which the rotary cutter D and knives E are operated.

A frame, F, composed of two standards, $f\ f$, sleeved on the axle B, and a cross-piece, $f'$, carries the doubly-curved crank $f''$, which is caused to revolve by a pulley, $f^3$, driven by a band, $f^4$, from the grooved inner wheel $c'$.

To the crank $f''$ are affixed two rods, $f^5\ f^5$, connected to the handles of the knives E, so that the revolution of the crank causes the alternate elevation and depression of each blade.

The frame F may be rotated on the axle B by means of the branched arm H, operated by the handle $h$, pivoted to the frame A, and traversing on the vertical arc $a$.

The branched arm H also carries a roller, I, revolving on an axis, $i$.

A cutter, D, having several blades, revolves on an axis, $d$, near the front of the frame A, being rotated by a band, $f^6$, passing over a pulley, $f^7$, on its axis, and driven by the inner wheel $c$.

The front of the machine is supported by a wheel or wheels, and is provided with a tongue or shafts for drawing and guiding.

Endless chains or gearing may replace the belts represented and described for rotating the pulleys which operate the cutters.

Operation.

The revolution of the wheels as the carriage is drawn forward causes the revolution of the pulleys $f^3\ f^7$, which respectively rotate the circularly-cutting blades D and operate the knives E.

The rotary cutter D is made to revolve so as to cut upwardly by the arrangement of its driving-belt, endless chain, or gearing, the twigs offering sufficient resistance to the blades to allow them to be readily severed. At the same time the revolution of the wheels causes the rotation of the pulley $f^3$, and its shaft alternately elevating and depressing the cranks on the shaft, and causing the knife-blades to move up and down, alternately severing the twigs, and being withdrawn for another stroke.

The roller I, in its progress, presses down the tops of the plants, and presents them in the most favorable direction to the action of the cutting edges of the knives.

By means of the handle $h$ the knife-carrying frame F may be made to form any angle with the ground, and thus, while the rotary cutter D is trimming the side of the hedge in a perpendicular direction, the knives E may be moved so as to cut the tops of the plants in the most advantageous manner, while the tongue offers a means of guiding the machine so as to act on any side of the object.

Claims.

We claim as our invention—

1. The combination and arrangement of the frames A and F, arm H, handle $h$, vertical arc $a$, crank-shaft $f'$, and roller I, all substantially as represented and described, for the purposes specified.

2. The knives E, operated from the wheel C' by belting or gearing and cranks, in combination with the frames A and F, arm H, handle $h$, and vertical arc $a$, all substantially as specified.

3. The roller I, for holding down the tops of the plants while being severed, in combination with the knives E, substantially as represented and described.

GEORGE CLARK.
SAMUEL P. CLARK.

Witnesses:
WARREN POOLE,
S. V. POOLE.